(12) United States Patent　　　　(10) Patent No.:　US 12,659,134 B1

Ziegler　　　　　　　　　　　　　(45) Date of Patent:　Jun. 16, 2026

(54) DETECTION OF TAMPERING WITH RFID SCAN INFORMATION

(71) Applicant: TelemeTrak, Inc., Oakland, CA (US)

(72) Inventor: Frederick Steinway Ziegler, San Francisco, CA (US)

(73) Assignee: TelemeTrak, Inc., Oakland, CA (US)

( * ) Notice: Subject to any disclaimer, the term of this patent is extended or adjusted under 35 U.S.C. 154(b) by 0 days.

(21) Appl. No.: 18/642,527

(22) Filed: Apr. 22, 2024

Related U.S. Application Data

(60) Provisional application No. 63/460,654, filed on Apr. 20, 2023.

(51) Int. Cl.
　　　H04L 9/08　　　　(2006.01)
　　　G06K 7/10　　　　(2006.01)
　　　H04L 9/00　　　　(2022.01)
(52) U.S. Cl.
　　　CPC ........ H04L 9/0822 (2013.01); G06K 7/10445 (2013.01); H04L 9/50 (2022.05)
(58) Field of Classification Search
　　　CPC ...... H04L 9/0822; H04L 9/50; G06K 7/10445
　　　USPC ......................................................... 713/171
　　　See application file for complete search history.

(56) References Cited

U.S. PATENT DOCUMENTS

| | | | | |
|---|---|---|---|---|
| 10,715,329 | B1 * | 7/2020 | Wellman | H04L 63/0861 |
| 11,991,284 | B1 * | 5/2024 | Ghabel | G06K 19/06037 |
| 2021/0027608 | A1 * | 1/2021 | Shakedd | G08B 21/24 |
| 2021/0216958 | A1 * | 7/2021 | Pacheco | H04L 9/3239 |
| 2022/0198034 | A1 * | 6/2022 | Rodriguez | H04L 9/008 |
| 2024/0222723 | A1 * | 7/2024 | Ropel | H01M 10/48 |
| 2025/0103999 | A1 * | 3/2025 | Higuchi | G06Q 10/083 |

FOREIGN PATENT DOCUMENTS

| | | | | | |
|---|---|---|---|---|---|
| CN | 115022057 | A | * | 9/2022 | H04L 9/0869 |
| CN | 116385023 | A | * | 7/2023 | G06Q 30/018 |
| CN | 118035344 | A | * | 5/2024 | G06F 11/1469 |

* cited by examiner

*Primary Examiner* — Meng Vang

(74) *Attorney, Agent, or Firm* — The Law Office of Raul D. Martinez, PC

(57)　　　　　　　ABSTRACT

The devices, systems, and methods described herein facilitate the detection of tampering with RFID scan information associated with an item carried by a cargo transport platform. In some examples, an RFID reader scans a cargo area of the cargo transport platform to detect RFID tags that are each associated with a particular item carried by the cargo transport platform. The RFID scan information generated by the RFID reader is recorded in a database. If any of the records in the database were tampered with after being recorded, the system uses blockchain technology to enable interested parties to detect the tampering and identify which records were modified, added, or deleted.

19 Claims, 3 Drawing Sheets

<u>400</u>　　（ START ）

RECEIVING SIGNALS CONTAINING DATA REPRESENTING A FIRST DATABASE COMPRISING RECORDS REPRESENTING RFID SCAN INFORMATION ASSOCIATED WITH THE ITEM　— 402

SYNCHRONIZING THE FIRST DATABASE WITH A SECOND DATABASE STORED ON A SERVER　— 404

COMPARING THE FIRST DATABASE WITH THE SECOND DATABASE　— 406

DETECTING, BASED ON THE COMPARISON OF THE FIRST DATABASE AND THE SECOND DATABASE, THAT THE FIRST DATABASE HAS BEEN TAMPERED WITH WHEN THERE IS A DISCREPANCY BETWEEN THE FIRST DATABASE AND THE SECOND DATABASE　— 408

100

104

108

DETECTION OF TAMPERING WITH RFID SCAN INFORMATION

CLAIM OF PRIORITY

The present application claims priority to U.S. Patent Application No. 63/460,654, entitled "DETECTION OF RFID TAGS CARRIED BY A CARGO TRANSPORT PLATFORM" and filed Apr. 20, 2023, which is assigned to the assignee hereof and hereby expressly incorporated by reference in its entirety.

FIELD

The subject matter described herein relates to detecting and logging radio-frequency identification (RFID) scan information and more particularly to determining whether the logged RFID scan information has been tampered with.

BACKGROUND

Interested parties would like to perform periodic RFID scans of a cargo transport platform to detect all items with a conforming RFID tag being carried in or on the cargo transport platform so that accurate tracking of items can occur.

SUMMARY

The devices, systems, and methods described herein facilitate the detection of tampering with RFID scan information associated with an item carried by a cargo transport platform. In some examples, an RFID reader scans a cargo area of the cargo transport platform to detect RFID tags that are each associated with a particular item carried by the cargo transport platform. The RFID scan information generated by the RFID reader is recorded in a database. If any of the records in the database were tampered with after being recorded, the system uses blockchain technology to enable interested parties to detect the tampering and identify which records were modified, added, or deleted.

DETAILED DESCRIPTION

Figures 1A, 1B:
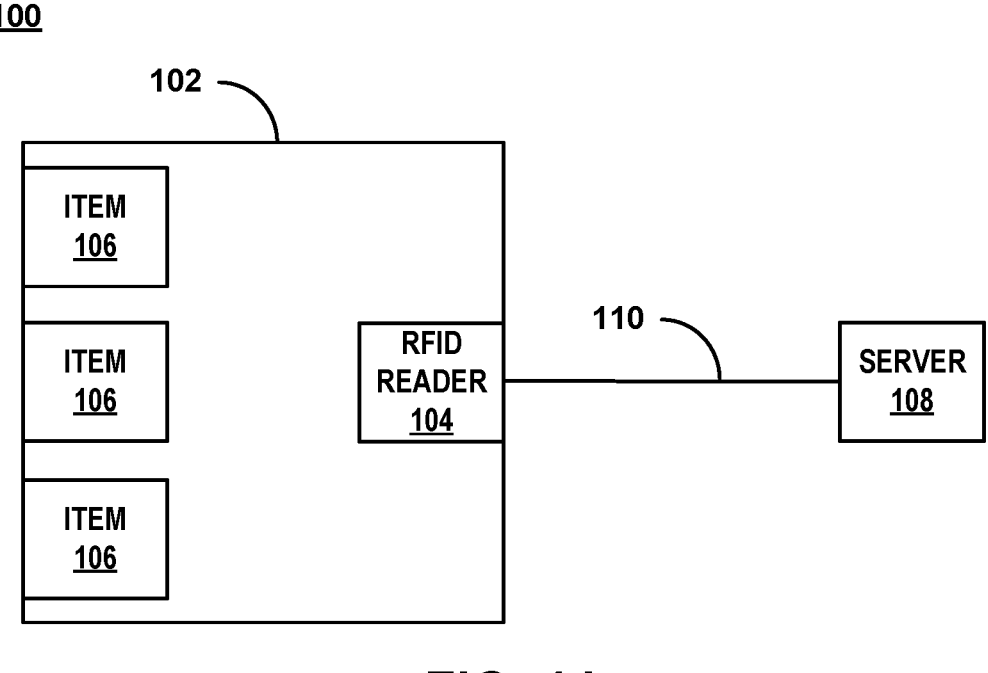
FIG. 1A shows an example of a system in which an RFID reader is located within a cargo transport platform.
FIG. 1B shows an example of a variation of the system shown in FIG. 1A in which the RFID reader is located outside of the cargo transport platform.

Radio-frequency identification (RFID) uses electromagnetic fields to automatically identify and track tags attached to objects. An RFID system consists of a tiny radio transponder called a tag, a radio receiver, and a transmitter. When triggered by an electromagnetic interrogation pulse from a nearby RFID reader device, the tag transmits digital data, usually containing identifying information, back to the reader. Passive RFID tags are powered by energy from the RFID reader's interrogating radio waves. Active RFID tags are powered by a battery and thus can be read at a greater range from the RFID reader, up to hundreds of meters.

Interested parties would like to perform periodic RFID scans of a cargo transport platform to detect RFID-tagged items that are located in or on the cargo transport platform. A computer record of each RFID tag detected is written to a file or database along with other pertinent information, which may include the time, date, and geolocation of the RFID scan and the RFID tag of the cargo transport platform, if known. The RFID scan is performed by an RFID reader, which may be carried by a human or robotic operator, affixed to the cargo transport platform, or affixed to a structure within RFID reading range of the RFID tags carried by the cargo transport platform. Sometime after an RFID scan has been performed, the records may be synchronized with a server.

An unauthorized party may wish to modify or tamper with the RFID scan records once they have been recorded. For example, such a party may wish to delete the record of an item that the party plans to steal in order to establish that the item was missing at the time of the scan. In other examples, such a party may wish to insert the record of an item that has already been stolen in order to establish that the item was still present at the time of the scan. In further examples, such a party may wish to modify the record of an item that the party has tampered with or replaced in order to avoid detection of the tampering or replacement at the time of the scan. There are numerous other scenarios of an unauthorized party wishing to modify the RFID scan records.

The devices, systems, and methods described herein facilitate the detection of tampering with data associated with RFID scan information. Although the examples discussed below are generally focused on detecting tampering with RFID scan information associated with an item carried by a cargo transport platform, the devices, systems, and methods may be used to detect tampering with RFID scan information in any other suitable context. For example, detection of tampering with RFID scan information can be useful for inventory management in warehouses and retail establishments.

Within the context of detecting tampering with RFID scan information associated with an item carried by a cargo transport platform, an RFID reader scans a cargo area of the cargo transport platform to detect RFID tags that are each associated with a particular item carried by the cargo transport platform. The RFID scan information generated by the RFID reader is recorded in a database. If any of the records in the database were tampered with after being recorded, the system uses blockchain technology to enable interested parties to detect the tampering and identify which records were modified, added, or deleted.

Although the different examples of detecting tampering with RFID scan information may be described herein separately, any of the features of any of the examples may be added to, omitted from, or combined with any other example.

As used herein, a cargo transport platform can be any suitable platform used to transport cargo. Some examples of a cargo transport platform include a dry-van trailer, flatbed trailer, intermodal container, railway car, or aircraft cargo bay. Cargo comprises individual goods transported on a platform by trucking, rail, aircraft, or water, for example. While cargo transport platforms do vary in size and dimensions, some examples of transport platforms may share the following characteristics: (1) the platform is designed to carry cargo, (2) the platform comprises a single area for supporting the cargo, and (3) the length of the cargo transport platform exceeds its width, typically by a factor of two or more. Many cargo transport platforms are enclosed and have one or two large doors for loading and unloading the cargo, few or no windows, and metal walls. Other cargo transport platforms may have an open cargo area, such that the cargo is not located within an enclosure but merely rests on the cargo transport platform. In other examples, a cargo transport platform may have other characteristics, features, or dimensions, which differ from those described above.

FIG. 1A shows an example of a system in which an RFID reader is located within a cargo transport platform. In the example shown in FIG. 1A, system 100 is utilized to detect tampering with data associated with items 106 carried by cargo transport platform 102. System 100 includes radio-frequency identification (RFID) reader 104 and server 108, with communications link 110 between RFID reader 104 and server 108.

In the example shown in FIG. 1A, RFID reader 104 is part of an Active Reader Passive Tag (ARPT) system, which has an active reader, which transmits interrogator signals and also receives authentication replies from passive RFID tags. In other examples, the RFID reader is part of an Active Reader Active Tag (ARAT) system, which uses active RFID tags activated with an interrogator signal from the active reader. A variation of the ARAT system could also use a Battery-Assisted Passive (BAP) tag, which acts like a passive tag but has a small battery to boost the strength of the tag's return reporting signal. In further examples, the RFID reader is part of a Passive Reader Active Tag (PRAT) system, which has a passive reader that only receives radio signals from active tags (e.g., battery operated, transmit only).

Figure 2:
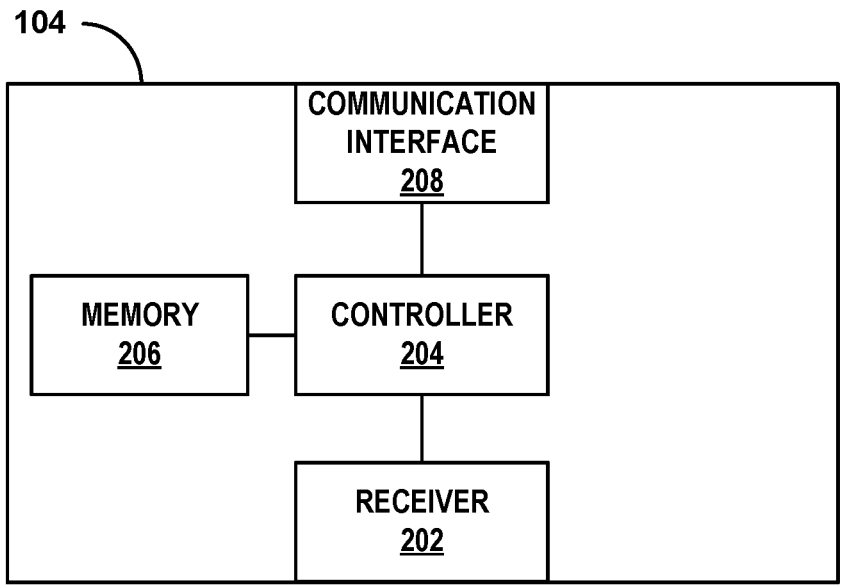
FIG. 2 shows an example of the RFID reader shown in FIGS. 1A and 1B.

FIG. 2 shows an example of RFID reader 104 shown in FIG. 1A. In the example shown in FIG. 2, RFID reader 104 includes receiver 202, controller 204, memory 206, and communication interface 208. Receiver 202 is a receiver to receive radio signals from RFID tags.

Controller 204 includes any combination of hardware, software, and/or firmware for executing the functions described herein. An example of a suitable controller 204 includes software code running on a microprocessor or processor arrangement connected to memory 206. Memory 206 is also used to store a public encryption key and records containing RFID scan information in a database.

Communication interface 208 is used to transmit the database to server 108 via communications link 110. Communication interface 208 may be any suitable interface by which RFID reader 104 transmits the database to server 108. In some examples, communication interface 208 may be a wired communication interface. In other examples, communication interface 208 may be a wireless communication interface.

Figure 3:
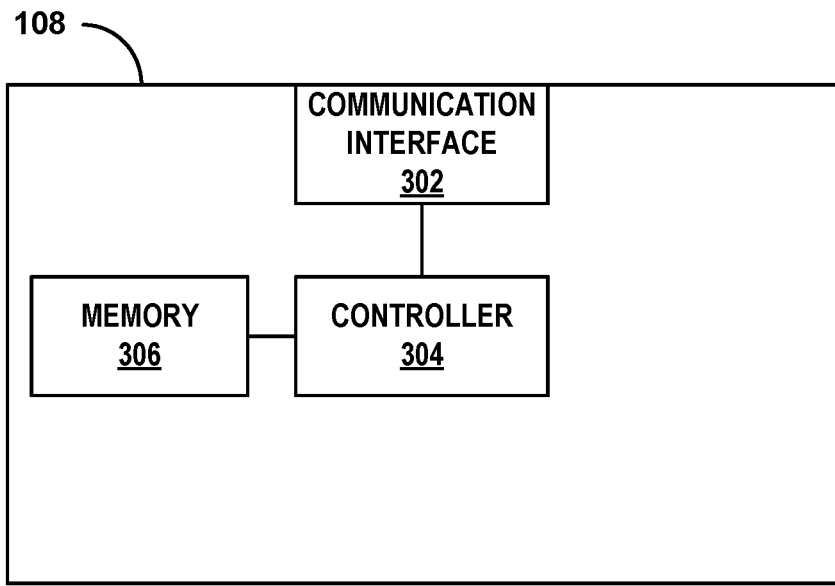
FIG. 3 shows an example of the server shown in FIGS. 1A and 1B.

FIG. 3 shows an example of the server shown in FIG. 1A. In the example shown in FIG. 3, server 108 includes communication interface 302, controller 304, and memory 306. Communication interface 302 is used to receive the database from RFID reader 104 via communications link 110. Communication interface 302 may be any suitable interface by which server 108 receives the database from RFID reader 104. In some examples, communication interface 302 may be a wired communication interface. In other examples, communication interface 302 may be a wireless communication interface.

Controller 304 includes any combination of hardware, software, and/or firmware for executing the functions described herein. An example of a suitable controller 304 includes software code running on a microprocessor or processor arrangement connected to memory 306. Memory 306 is also used to store a private decryption key and records containing RFID scan information in a database.

In the example shown in FIG. 1A, RFID reader 104 is located within cargo transport platform 102. More specifically, in the example shown in FIG. 1A, RFID reader 104 is movable through a cargo area of cargo transport platform 102. In some examples, RFID reader 104 may be a handheld, portable device that is movable within cargo transport platform 102. In further examples, RFID reader 104 may be controlled by a robotic operator to move within cargo transport platform 102.

In other examples, RFID reader 104 is coupled to cargo transport platform 102. In some of these examples, RFID reader 104 may be disposed at a fixed location within RFID reading range of the RFID tags. Such a configuration allows the creation of a specific interrogation zone in which tags can be read when entering and exiting cargo transport platform 102, in some examples.

In this regard, FIG. 1B shows an example of a variation of the system shown in FIG. 1A in which the RFID reader is located outside of the cargo transport platform. Thus, in the example, shown in FIG. 1B, RFID reader 104 may be located in a fixed position outside of cargo transport platform 102 that is within RFID reading range of the RFID tags located within cargo transport platform 102. In other examples, RFID reader 104 may be movable outside of cargo transport platform 102 within RFID reading range of the RFID tags located within cargo transport platform 102.

In operation, RFID reader 104 receives, from an RFID tag coupled to an item 106, a radio signal containing identifying information. In some examples, each item 106 shown in FIG. 1A will have its own RFID tag that transmits unique identifying information. In some examples, the identifying information includes one or more of the following: a unique identifier (UID) of the RFID tag, and information associated with the item.

Controller 204 records RFID scan information, which includes the identifying information, in a current record in a database associated with RFID reader 104. In some examples, the RFID scan information further includes one or more of the following that are associated with an RFID scan: a time at which the RFID scan occurred, a date on which the RFID scan occurred, and geolocation information associated with a geolocation where the RFID scan occurred. In some examples, the time, date, and/or geolocation information may be obtained by a Global Navigation Satellite System (GNSS) receiver that is either part of RFID reader 104 (not explicitly shown) or to which RFID reader 104 is communicatively coupled. In further examples, the RFID scan information can also include identifying information transmitted from an RFID tag coupled to cargo transport platform 102.

In some examples, controller 204 recording the RFID scan information in the current record in the database includes several steps. First, controller 204 performs a hash function on the RFID scan information to obtain a data hash. Next, controller 204 generates a record cipher, using the public encryption key, based at least partially on the data hash, a universally unique identifier (UUID) of the previous record, and a UUID of the current record. Controller 204 generates a blockchain hash of the previous record. Controller 204 stores, in memory 206, the current record, which includes the RFID scan information, the blockchain hash of the previous record, the record cipher, and the UUID of the current record. Controller 204 encrypts the UUID of the previous record with the public encryption key and stores, in memory 206, the encrypted UUID of the previous record. In some examples, storing the encrypted UUID of the previous record includes overwriting the unencrypted UUID of the previous record with the encrypted UUID of the previous record. In other examples, the unencrypted version of the UUID of the previous record can be deleted rather than overwritten.

RFID reader 104 uses communication interface 208 to transmit its database to server 108 via communications link 110. In some examples, RFID reader 104 periodically transmits its database to server 108. In other examples, RFID reader 104 transmits its database to server 108 when a relative distance between RFID reader 104 and server 108 is below a threshold value. In further examples, RFID reader 104 transmits its database to server 108 when instructed by a user of RFID reader 104.

Upon receiving signals containing data representing the database of RFID reader 104, server 108 utilizes a private decryption key that corresponds with the public encryption key to decrypt the records in the database received from RFID reader 104. Server 108 then synchronizes the decrypted records of the database received from RFID reader 104 with a database stored on server 108, which reflects one or more previous records that was received from RFID reader 104 during the last synchronization between RFID reader 104 and server 108. Thus, in some examples, each time RFID reader 104 synchronizes with server 108, server 108 will read and store the transactions (e.g., records indicating that items that have been added to or removed from cargo transport platform 102), which have occurred since the last synchronization between RFID reader 104 and server 108.

After the database received from RFID reader 104 is synchronized with the database stored on server 108, server 108 compares the two databases. If there is no discrepancy between the two databases, no tampering with the RFID scan information (e.g., data) has occurred. However, if there is a discrepancy between the database received from RFID reader 104 and the database stored on server 108, server 108 detects tampering with the database received from RFID reader 104. In some examples, tampering with the database received from RFID reader 104 includes one or more of the following: modification of one or more of the records in the database, addition of one or more of the records in the database, and deletion of one or more of the records in the database.

Figure 4:
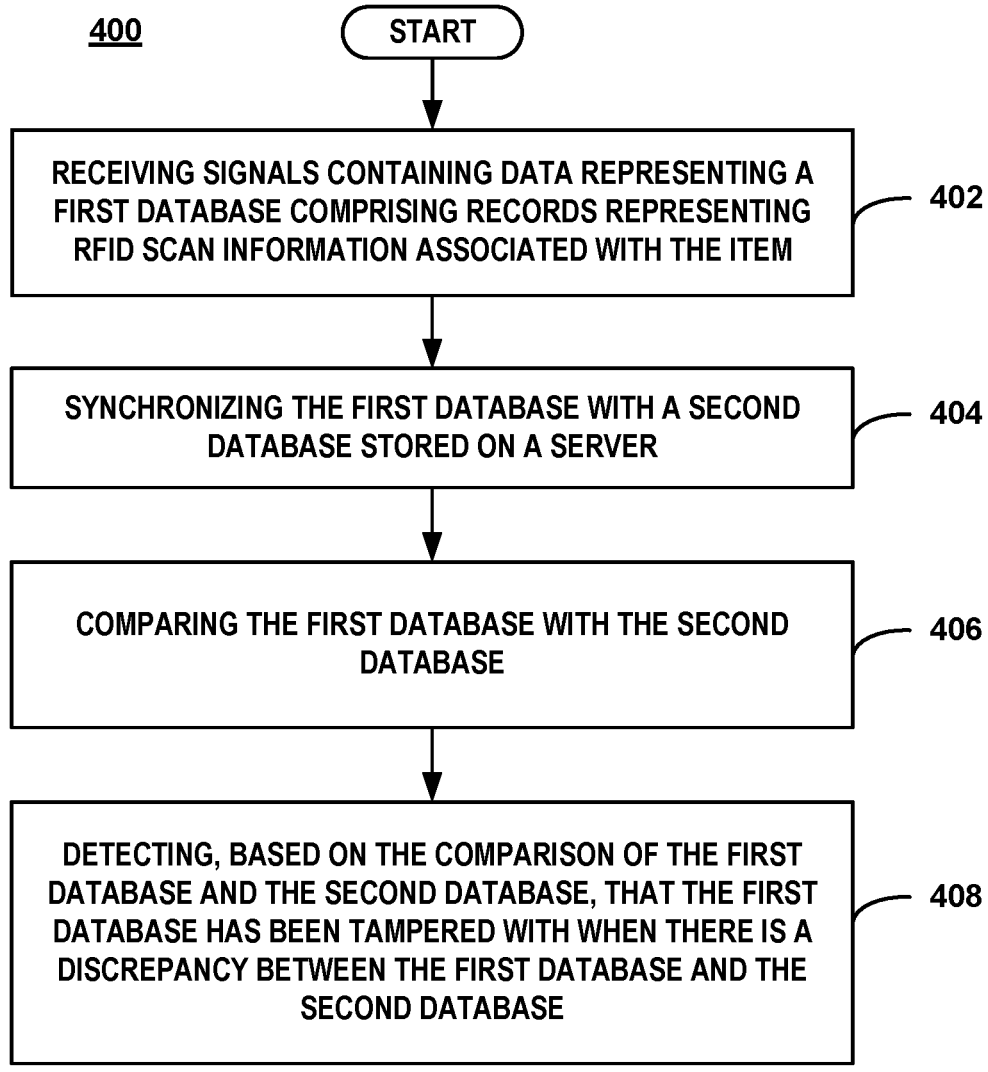
FIG. 4 is a flowchart of an example of a method of detecting tampering with tracking data associated with an item.

FIG. 4 is a flowchart of an example of a method of detecting tampering with tracking data associated with an item. The method 400 begins at step 402 with receiving signals containing data representing a first database comprising records representing RFID scan information associated with the item. At step 404, the first database is synchronized with a second database stored on a server. At step 406, the first database is compared with the second database. The method 400 continues at step 408, with detecting, based on the comparison of the first database and the second database, that the first database has been tampered with when there is a discrepancy between the first database and the second database. In other examples, one or more of the steps of method 400 may be omitted, combined, performed in parallel, or performed in a different order than that described herein or shown in FIG. 4. In still further examples, additional steps may be added to method 400 that are not explicitly described in connection with the example shown in FIG. 4.

Clearly, other examples and modifications of the foregoing will occur readily to those of ordinary skill in the art in view of these teachings. The above description is illustrative and not restrictive. The examples described herein are only to be limited by the following claims, which include all such examples and modifications when viewed in conjunction with the above specification and accompanying drawings. The scope of the foregoing should, therefore, be determined not with reference to the above description alone, but instead should be determined with reference to the appended claims along with their full scope of equivalents.

What is claimed is:

1. A system to detect tampering with data associated with an item carried by a cargo transport platform, the system comprising:
   a radio-frequency identification (RFID) reader comprising:
      a receiver configured to receive, from an RFID tag coupled to the item, a radio signal containing identifying information,
      a first controller configured to record RFID scan information, which includes the identifying information, in a current record in a first database stored within the RFID reader,
      a memory, located within the RFID reader, on which at least one previous record and a public encryption key are stored,
      wherein the first controller recording the RFID scan information in the current record in the first database includes the first controller:
         performing a hash function on the RFID scan information to obtain a data hash,
         generating a record cipher, using the public encryption key, based at least partially on the data hash, a universally unique identifier (UUID) of the previous record, and a UUID of the current record,
         generating a blockchain hash of the previous record,
         storing, in the memory, the current record, which includes the RFID scan information, the blockchain hash of the previous record, the record cipher, and the UUID of the current record,
         encrypting the UUID of the previous record with the public encryption key, and
         storing, in the memory, the encrypted UUID of the previous record, and
      transmitter configured to transmit the first database to a server,
   the server comprising a second controller configured to:
      utilize a private decryption key that corresponds with the public encryption key to decrypt records in the first database,
      synchronize the first database with a second database stored on the server,
      compare the first database with the second database, and
      detect, based on the comparison of the first database and the second database, that the first database has been tampered with when there is a discrepancy between the first database and the second database.

2. The system of claim 1, wherein the RFID reader is movable through a cargo area of the cargo transport platform.

3. The system of claim 2, wherein the RFID reader is a handheld, portable device.

4. The system of claim 2, wherein the RFID reader is controlled by a robotic operator.

5. The system of claim 1, wherein the RFID reader is coupled to the cargo transport platform.

6. The system of claim 1, wherein the RFID reader is disposed at a fixed location within RFID reading range of the RFID tag.

7. The system of claim 1, wherein the identifying information includes one or more of the following: a unique identifier (UID) of the RFID tag, and information associated with the item.

8. The system of claim 1, wherein the RFID scan information further includes one or more of the following that are associated with an RFID scan: a time at which the RFID scan occurred, a date on which the RFID scan occurred, and geolocation information associated with a geolocation where the RFID scan occurred.

9. The system of claim 1, wherein the transmitter comprises one or more of the following: a wired transmitter, and a wireless transmitter.

10. The system of claim 1, wherein tampering with the first database includes one or more of the following: modification of one or more of the records in the first database, addition of one or more of the records in the first database, and deletion of one or more of the records in the first database.

11. A server to detect tampering with tracking data associated with an item, the server comprising:
   a receiver configured to receive signals containing data representing a first database stored within a radio-frequency identification (RFID) reader, the first database comprising records representing RFID scan information associated with the item, the first database generated by:
      performing a hash function on the RFID scan information to obtain a data hash,
      generating a record cipher, using a public encryption key, based at least partially on the data hash, a universally unique identifier (UUID) of a previous record, and a UUID of a current record,
      generating a blockchain hash of the previous record,
      storing, in a memory located within the RFID reader, the current record, which includes the RFID scan information, the blockchain hash of the previous record, the record cipher, and the UUID of the current record,
      encrypting the UUID of the previous record with the public encryption key, and
      storing the encrypted UUID of the previous record; and
   a controller configured to:
      utilize a private decryption key that corresponds with the public encryption key to decrypt the records in the first database,
      synchronize the first database with a second database stored on the server,
      compare the first database with the second database, and
      detect, based on the comparison of the first database and the second database, that the first database has been tampered with when there is a discrepancy between the first database and the second database.

12. The server of claim 11, wherein the RFID scan information includes one or more of the following that are associated with an RFID scan: a time at which the RFID scan occurred, a date on which the RFID scan occurred, and geolocation information associated with a geolocation where the RFID scan occurred.

13. The server of claim 11, wherein the receiver comprises one or more of the following: a wired receiver, and a wireless receiver.

14. The server of claim 11, wherein tampering with the first database includes one or more of the following: modification of one or more of the records in the first database, addition of one or more of the records in the first database, and deletion of one or more of the records in the first database.

15. A method of detecting tampering with tracking data associated with an item, the method comprising:
   receiving signals containing data representing a first database stored within a radio-frequency identification (RFID) reader, the first database comprising records representing RFID scan information associated with the item, the first database generated by:
      performing a hash function on the RFID scan information to obtain a data hash,
      generating a record cipher, using a public encryption key, based at least partially on the data hash, a universally unique identifier (UUID) of a previous record, and a UUID of a current record,
      generating a blockchain hash of the previous record,
      storing, in a memory located within the RFID reader, the current record, which includes the RFID scan information, the blockchain hash of the previous record, the record cipher, and the UUID of the current record,
      encrypting the UUID of the previous record with the public encryption key, and
      storing the encrypted UUID of the previous record;
   utilizing a private decryption key that corresponds with the public encryption key to decrypt the records in the first database;
   synchronizing the first database with a second database stored on a server;
   comparing the first database with the second database; and
   detecting, based on the comparison of the first database and the second database, that the first database has been tampered with when there is a discrepancy between the first database and the second database.

16. The method of claim 15, wherein the RFID scan information includes one or more of the following that are associated with an RFID scan: a time at which the RFID scan occurred, a date on which the RFID scan occurred, and geolocation information associated with a geolocation where the RFID scan occurred.

17. The method of claim 15, wherein receiving signals containing data representing a first database comprises one or more of the following: receiving the signals via a wired receiver, and receiving the signals via a wireless receiver.

18. The method of claim 15, wherein tampering with the first database includes one or more of the following: modification of one or more of the records in the first database, addition of one or more of the records in the first database, and deletion of one or more of the records in the first database.

19. The method of claim 15, wherein the first database is further generated by:
   deleting an unencrypted version of the UUID of the previous record.

* * * * *